A. S. BLODGETT.
STABILIZER FOR STEERING MECHANISMS.
APPLICATION FILED FEB. 18, 1919.
1,320,978.
Patented Nov. 4, 1919.
2 SHEETS—SHEET 1.
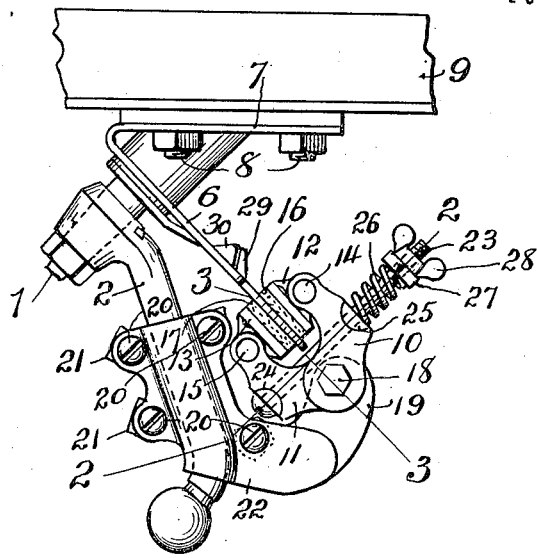
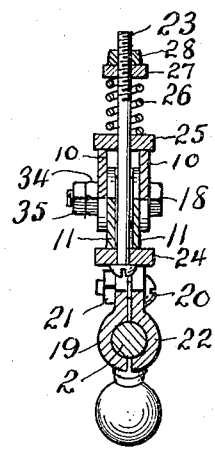
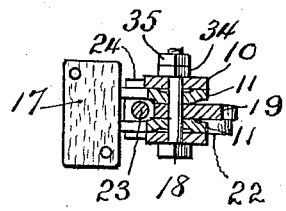
INVENTOR
Alexander S. Blodgett
BY
Warren D. House,
His ATTORNEY A. S. BLODGETT.
STABILIZER FOR STEERING MECHANISMS.
APPLICATION FILED FEB. 18, 1919.
1,320,978.
Patented Nov. 4, 1919.
2 SHEETS—SHEET 2.
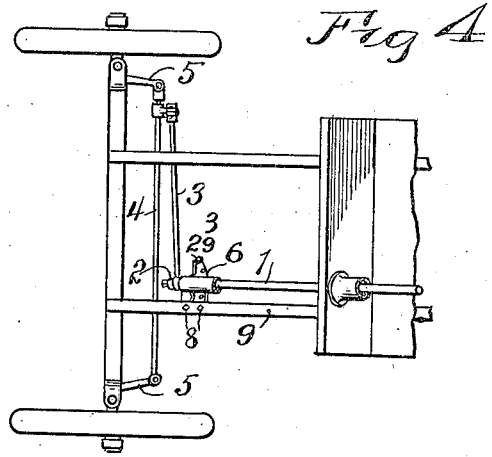
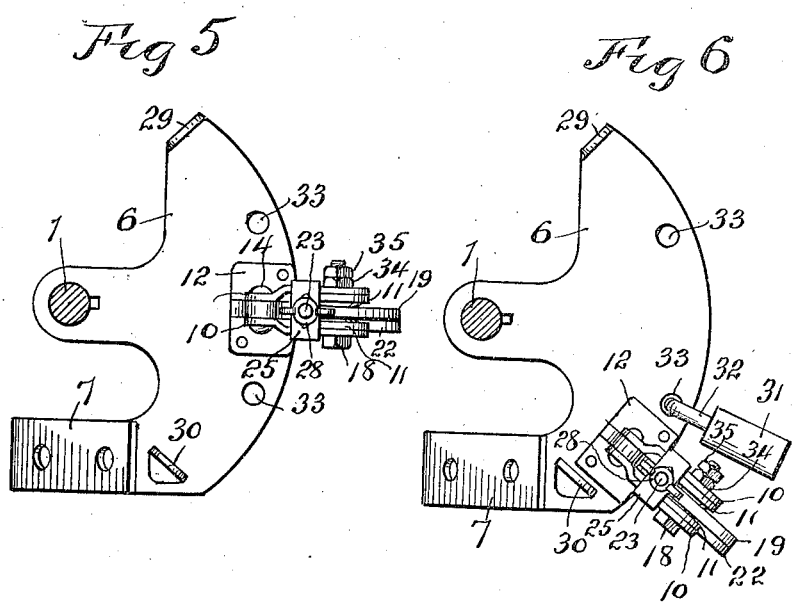

UNITED STATES PATENT OFFICE.

ALEXANDER S. BLODGETT, OF INDEPENDENCE, MISSOURI.

STABILIZER FOR STEERING MECHANISMS.

1,320,978.      Specification of Letters Patent.      Patented Nov. 4, 1919.

Application filed February 18, 1919. Serial No. 277,809.

*To all whom it may concern:*

Be it known that I, ALEXANDER S. BLODGETT, a citizen of the United States, residing at Independence, in the county of Jackson and State of Missouri, have invented a certain new and useful Improvement in Stabilizers for Steering Mechanisms, of which the following is a specification.

My invention relates to improvements in stabilizers for steering mechanisms. It is particularly well adapted for use on an automobile which is provided with a revoluble steering post having the usual crank arm for actuating the mechanism which swings the front wheels.

The object of my invention is to provide a stabilizer of novel construction which will yieldingly hold the steering wheel in the position to which it may be adjusted, thereby limiting the liability of accidental turning of the steering post and eliminating the necessity for constant attention of the operator of the machine.

My invention provides further novel means for limiting the revoluble movement of the steering wheel.

My invention provides still further novel means for locking the steering post, thereby preventing unauthorized use of the machine.

The novel features of my invention are hereinafter fully described and claimed.

In the accompanying drawing, which illustrates the preferred embodiment of my invention, Figure 1 is a side elevation showing my improved stabilizer mounted on a steering post.

Fig. 2 is a sectional view on the line 2—2 of Fig. 1.

Fig. 3 is a sectional view on the line 3—3 of Fig. 1.

Fig. 4 is a plan view of a portion of an automobile provided with my improvement.

Fig. 5 is a plan view of the stabilizer, showing the clamping members in the straight-ahead position of the steering wheel.

Fig. 6 is a view similar to Fig. 5, showing the clamping members turned to the left and held in that position by the locking device.

Similar reference characters designate similar parts in the different views.

1 designates an ordinary revoluble automobile steering post having a crank arm 2 connected by a link 3 to the oscillatable rod 5, which connects the cranks 5 of the spindles carrying the front wheels, Fig. 4.

A fixed member, preferably a flat plate 6 is mounted on the steering post 1 and has a horizontal arm 7 attached by bolts 8 to the under side of the automobile frame 9. The plate 6 is at right angles to the steering post 1 and inclines downwardly and rearwardly therefrom.

Two pairs of clamping members 10 and 11 are respectively pivoted to two blocks 12 and 13 by transverse pins 14 and 15. The blocks 12 and 13 are respectively located at opposite sides of the plate 6 and are respectively provided with facings 16 and 17, preferably of leather, which have sliding and frictional engagement with opposite sides of the plate 6.

The two pairs of clamping members 10 and 11 are pivoted by means of a transverse bolt 18 to a clamping plate 19, which is adapted to be rigidly clamped to the crank arm 2 by means of two pairs of screws 20, which have threaded engagement respectively with nuts 21, and which extend through the clamping plate 19 and also through the clamping plate 22 which is at the opposite side of the crank arm 2.

For yieldingly forcing the facings 16 and 17 tightly against the plate 2, there is provided a bolt 23, located between the members 10 and the members 11 and between the bolt 18 and the plate 6.

The bolt 23 extends through two transverse plates 24 and 25, which are convex on their inner sides, the convex surfaces bearing in concave seats provided in the outer edges of the members 10 and 11.

The head of the bolt 23 bears against the plate 24. Against the outer side of the plate 25 bears one end of a coil spring 26, which encircles the bolt 23 and has its other end bearing against a nut 27 mounted on the bolt 23. A lock nut 28 on the bolt 23 bears against the nut 27. By adjusting the nuts 27 and 28, the tension of the spring 26 may be varied, so as to vary the pressure of the leather facings 16 and 17 against the plate 6.

When the steering post 1 is swung to the right or left, the facings 16 and 17 slide on the plate 6, and yieldingly clampingly embrace the plate so as to hold the steering post 1 from accidental displacement from the position in which it is set. This eliminates the jarring and jerking of the steering wheel in the driver's hands.

To prevent the steering wheel being turned in either direction, a distance such that the facings 16 and 17 will slide off from the plate 6, I provide means for limiting the range of movement of the crank arm 2 to the right or left of the middle or straight-ahead position. In the preferred form of my invention shown, this limitation of the normal range of movement is effected by means of two laterally turned tongues or projections 29 and 30 on the plate 6 at opposite sides of the steering post 1, and which form abutments, against which the block 12 is adapted to strike, said block being located intermediate of the abutments 29 and 30.

In order that unauthorized successful use of the automobile may be prevented, I provide a novel locking device consisting, preferably, of a padlock 31, Fig. 6, the hasp 32 of which is adapted to be removably inserted in either of two holes 33 provided in the plate 6 intermediate of the abutments 29 and 30. The holes 33 are so located in the plate 6 that the hasp 32 will be in the path of movement of the blocks 12 and 13, whereby the latter will be held from being swung from a position at the right or left of the center.

The bolt 18 is provided with a nut 34, which bears against the adjacent member 10 and with a lock nut 35 which bears against the nut 34.

With the tension of the spring 26 properly adjusted, and the padlock 31 removed, the facings 16 and 17 bearing on the plate 6 will yieldingly hold the steering post 1 in the position to which it may be set through the intermediacy of the blocks 12 and 13, the members 10 and 11, clamping plates 19 and 22 and the crank arm 2.

To prevent unauthorized use of the machine, the steering post may be turned so as to bring the blocks 12 and 13 between the abutment 30 and adjacent hole 33, or between the abutment 29 and the hole 33 adjacent thereto, after which the hasp 32 of the padlock 31 is inserted through the hole 33 adjacent to the blocks 12 and 13 and then locked, as shown in Fig. 6.

I do not limit my invention to the structure shown and described, as modifications, within the scope of the appended claims, may be made without departing from the spirit of my invention.

What I claim is:—

1. In a stabilizer for steering mechanism, two members, one fixed and the other movable arranged to have sliding frictional engagement one with the other, and means for supporting the movable member upon a revoluble steering post, the other member having means for limiting the range of movement of the movable member.

2. In a stabilizer for steering mechanism, two members, one fixed and the other movable having sliding frictional engagement with each other, the fixed member having means for limiting the range of movement of the movable member, releasable means for holding the movable member from having such range of movement, and means adapted to be carried by a revoluble steering post for supporting the movable member.

3. In a stabilizer for steering mechanism, a fixed member having two abutments, a movable member having sliding frictional engagement with the fixed member and having its range of movement limited by said abutments, and means adapted to be supported by a revoluble steering post for supporting the movable member.

4. In a stabilizer for steering mechanism, a fixed member having two abutments, two clamping members having frictional engagement with opposite sides of said fixed member and having their range of movement limited by said abutments, and means adapted to be carried by a revoluble steering post for supporting said clamping members.

5. In a stabilizer for steering mechanism, a flat fixed plate having two projections, a movable member having frictional engagement with said plate, said projections being at opposite sides of said movable member and in the path of movement of the latter and serving to limit the range of movement of the movable member, and means adapted to be supported by a revoluble steering post for supporting the movable member.

6. In a stabilizer for steering mechanism, a fixed member, a movable member having frictional engagement therewith and normally having a pre-determined range of movement, releasable means for holding the movable member from said range of movement, and means adapted to be supported by a revoluble steering post for supporting and moving said movable member.

7. In a stabilizer for steering mechanism, a fixed member having a hole adapted to receive therethrough a releasable locking device, a movable member having sliding frictional engagement with the fixed member and adapted to have its normal range of movement obstructed by the locking device, when the latter is in operative position, and means adapted to be supported by a revoluble steering post for supporting and moving said movable member.

8. In a stabilizer for steering mechanism, a fixed member having two abutments, and having a hole intermediate of said abutments, a movable member having sliding frictional engagement with the fixed member and having its range of movement limited by said abutments, means adapted to be carried by a revoluble steering post for supporting and moving the movable member, and a releasable locking device adapted for insertion in said hole for holding the movable member from such range of movement.

9. In a stabilizer for steering mechanism, a fixed member having two abutments, two clamping members respectively having sliding frictional engagement with opposite sides of said fixed member, one of the movable members being mounted between and adapted to have its range of movement limited by said abutments, releasable means for holding the clamping members from such range of movement, and means adapted to be supported by a revoluble steering post for simultaneously moving said clamping members.

10. In a stabilizer for steering mechanism, a fixed member having two abutments, two clamping members having sliding frictional engagement respectively with opposite sides of said fixed member, yielding means for forcing said clamping members toward the fixed member, and means adapted to be carried by a revoluble steering post for supporting and moving said clamping members, the range of movement of one of the latter being limited by said abutments.

11. In a stabilizer for steering mechanism, a fixed member, and two clamping members adapted to be carried and oscillated by a revoluble steering post and having respectively sliding frictional engagement with opposite sides of said fixed member, the latter having means for limiting the range of oscillation of said clamping members.

12. In a stabilizer for steering mechanism, a fixed member, two clamping members, yielding means for forcing said clamping members into sliding frictional engagement with opposite sides of said fixed member, the latter having means for limiting the range of movement of one of said clamping members, and means adapted to be carried by a revoluble steering post for supporting and oscillating said clamping members.

13. In a stabilizer for steering mechanism, a fixed member having two abutments and a hole intermediate of said abutments adapted to receive a locking device, two clamping members, yielding means for forcing said clamping members into sliding frictional engagement with opposite sides respectively of said fixed member, said abutments limiting the oscillation of one of the clamping members, said clamping members being adapted to be held from such range of movement by said locking device when the latter is in said hole, and means adapted to be carried by a revoluble steering post for supporting and moving said clamping members between said abutments.

14. In a stabilizer for steering mechanism, a fixed member having two abutments, a clamping member having sliding frictional engagement with the fixed member and having its range of movement limited by said abutments, and two clamping plates having means for being clamped to the crank of a revoluble steering post, one of the clamping plates pivotally supporting the clamping member.

15. In a stabilizer for steering mechanism, a fixed member, two abutments on the fixed member, two clamping plates provided with means for clamping between them the crank of a revoluble steering post, and two clamping members pivoted to one of said clamping plates and having sliding frictional engagement respectively with opposite sides of the fixed member and having their range of movement limited by said abutment.

16. In a stabilizer for steering mechanism, two clamping plates, a revoluble steering post having a crank arm held clamped between said two clamping plates, a clamping member pivoted to one of said clamping plates and having sliding frictional engagement with said fixed member and having its range of movement limited by said fixed member, and yielding means for forcing the clamping member against said fixed member.

In testimony whereof I have signed my name to this specification.

ALEXANDER S. BLODGETT.

Copies of this patent may be obtained for five cents each, by addressing the "Commissioner of Patents, Washington, D. C."